United States Patent
Chapman

(10) Patent No.: US 9,031,134 B2
(45) Date of Patent: May 12, 2015

(54) SYSTEM FOR DETECTING SEQUENCES OF FROZEN FRAME IN BASEBAND DIGITAL VIDEO

(75) Inventor: Peter Chapman, Bristol (GB)

(73) Assignee: Tektronix International Sales GmbH, Rheinfall (CH)

( * ) Notice: Subject to any disclaimer, the term of this patent is extended or adjusted under 35 U.S.C. 154(b) by 1315 days.

(21) Appl. No.: 12/248,641

(22) Filed: Oct. 9, 2008

(65) Prior Publication Data

US 2009/0128633 A1 May 21, 2009

(30) Foreign Application Priority Data

Oct. 9, 2007 (EP) ..................................... 07253977

(51) Int. Cl.
  *H04N 7/18* (2006.01)
  *H04N 19/137* (2014.01)
  *H04N 19/176* (2014.01)
  *H04N 19/87* (2014.01)

(52) U.S. Cl.
  CPC ........... *H04N 19/137* (2014.11); *H04N 19/176* (2014.11); *H04N 19/87* (2014.11)

(58) Field of Classification Search
  CPC .. H04N 7/50; H04N 7/26244; H04N 7/26313
  USPC .................. 348/96–110, 699–702; 375/240.01–240.29
  See application file for complete search history.

(56) References Cited

U.S. PATENT DOCUMENTS

| | | | |
|---|---|---|---|
| 5,828,786 A | * | 10/1998 | Rao et al. ...................... 382/236 |
| 2001/0003468 A1 | * | 6/2001 | Hampapur et al. ........... 348/700 |
| 2002/0069408 A1 | | 6/2002 | Abe et al. |
| 2005/0220188 A1 | | 10/2005 | Wang |

FOREIGN PATENT DOCUMENTS

| | | |
|---|---|---|
| EP | 0856995 A2 | 8/1998 |
| GB | 2410634 A | 8/2005 |
| JP | H11194745 | 7/1999 |
| JP | 200113914 | 1/2001 |
| WO | 2005029833 A | 3/2005 |

OTHER PUBLICATIONS

Emrullah Durucan, "Low Computational Cost Illumination Invariant Change Detection for Video Surveillance by Linear Independence," 2002, Ecole Polytechnique Federale De Lausanne, Lausanne, EPFL 2454, XP002473714.

* cited by examiner

*Primary Examiner* — Andy Rao
(74) *Attorney, Agent, or Firm* — Francis I. Gray; Michael A. Nelson; Marger Johnson & McCollom PC

(57) ABSTRACT

An apparatus and method of evaluating whether an image under test is similar to a reference image, the method comprising performing a test on pairs of blocks in turn, each pair of blocks comprising a block of the image under test and a corresponding block of the reference image, the test comprising calculating a difference measure indicative of the difference between the blocks and comparing the difference measure to a threshold, wherein the test is passed if the difference measure betters the threshold, and the image under test and the reference image are deemed to be similar if the test is passed by all of the pairs of blocks.

26 Claims, 4 Drawing Sheets

SYSTEM FOR DETECTING SEQUENCES OF FROZEN FRAME IN BASEBAND DIGITAL VIDEO

FIELD OF THE INVENTION

The present invention relates to a method and apparatus for determining whether an image under test is similar to a reference image. The invention is particularly applicable to determining whether a sequence of video frames can be considered to be static.

BACKGROUND

In many applications involving video footage, it is useful to be able to determine if a sequence of video frames (i.e. the individual images which, when viewed sequentially, make up a sequence of moving images) of the video footage can be considered to be static. For example, it is a common requirement for video advertisements intended for television or other similar media to have a frozen sequence of frames (i.e. a sequence of substantially identical frames) at the end. It is also useful to be able to check video footage for unexpected sequences of frozen frames, which is a common feature of video footage which has been incorrectly converted from analogue to digital formats.

It is important that any method for determining whether a sequence of video frames can be considered to be static is robust in the presence of noise in the video footage or signal of interest. Such noise typically arises during analogue capture and transmission processes, and in the process of digitally compressing the video footage. It is also important that any such method is able to detect changes in only a small part of the video frames making up the video footage.

One approach to determining if a sequence of video frames can be considered to be static is to calculate an RMS difference value between pairs of adjacent frames (referred to as the reference frame and the subsequent frame) in the sequence. In this method, the difference between a value of each pixel of the reference frame and a value of each corresponding pixel of the subsequent frame is calculated. These differences are squared, and the sum of the resulting squares is calculated and averaged, by dividing the sum of the squares by the number of pixels in a single frame. The square root of the result of this averaging operation is then calculated and compared to a threshold to assess whether the differences between the frames are within acceptable limits, indicating that the subsequent frame is substantially the same as the reference frame. This test is repeated for all of the frames in the sequence, and if all of the frames are found to be substantially the same as their adjacent frames, the frame sequence can be considered to be static.

A disadvantage of this approach is that if the threshold is made large enough to exclude the effects of noise from the assessment of whether the subsequent frame is substantially the same as the reference frame, movement in a small part of the frames (i.e. differences in pixel values between a small part of the subsequent frame and a corresponding part of the reference frame) may not be detected, thus giving rise to false positive assessments that the frame sequence can be considered to be static.

An alternative approach is to calculate the difference between corresponding pixels of the reference and subsequent video frames and compare each of these individual differences to a threshold. A test is then made to calculate the proportion of the individual differences, for the entire video frame, which exceed the threshold, and if this proportion is below a predetermined maximum for all of the frames in the sequence, the frame sequence can be considered to be static.

A difficulty with this approach is that it is not very sensitive to differences between frames which are caused by noise, and is also not particularly sensitive to movement in a small part of a frame.

Additionally, both of the approaches described above are computationally intensive, as the calculation of the difference between corresponding pixels of the first and subsequent frames must be carried out for all of the pixels making up a frame.

SUMMARY

According to a first aspect of the invention, there is provided a method of evaluating whether an image under test is similar to a reference image, the method comprising performing a test on pairs of blocks in turn, each pair of blocks comprising a block of the image under test and a corresponding block of the reference image, the test comprising calculating a difference measure indicative of the difference between the blocks and comparing the difference measure to a threshold, wherein the test is passed if the difference measure betters the threshold, and the image under test and the reference image are deemed to be similar if the test is passed by all of the pairs of blocks.

Partitioning the images into blocks reduces the amount of time and processing resources required to detect if the images are different, as only a small subset of the pixels contained in the images needs to be used to reach an evaluation that the images are different. For example, in a "best-case" scenario, the difference measure calculated for a first pair of corresponding blocks of the image under test and the reference image may exceed the threshold, indicating that the images are different. Thus, no further processing of the images is necessary. Even if additional pairs of corresponding blocks need to be tested, it is likely that if the images are different, this will be detected before all of the corresponding pixels of the image under test and the reference image have been compared, thus reducing the time and computational burden in comparison to known methods.

Additionally, the use of this "block-wise" approach to evaluating whether the image under test and the reference image are similar offers improved sensitivity to movement (i.e. differences in pixel values) occurring in a small part of the images.

If the test is not passed by a pair of blocks, an indication may be provided that the image under test and the reference image are deemed to be different.

A first pair of blocks to be tested may be selected to maximize the likelihood that the test will not be passed.

For example, a pair of blocks positioned towards the center of their respective images may be selected. As movement (i.e. differences in pixel values between the image under test and the reference image) may be most likely to occur towards the center of the images, selecting a pair of blocks towards the center of the respective images may increase the likelihood that this movement will be detected early in the testing process.

The threshold may be adjustable, according to the level of sensitivity or noise immunity required.

The threshold may be derived as a function of one of the image under test and the reference image.

For example, the threshold may be derived from statistical properties of one of the image under test and the reference image.

The difference measure may comprise a root mean squared (RMS) difference measure.

Alternatively, the difference measure may comprise a mean absolute difference (MAD) difference measure.

Alternatively, the difference measure may be calculated by calculating difference values of corresponding pixels of the pair of blocks, and counting the number of the difference values that exceed a threshold.

The image under test and the reference image may be video frames.

According to a second aspect of the invention, there is provided a method of evaluating whether a sequence of video frames can be considered to be static, the method comprising capturing a reference frame and a subsequent frame of the sequence and performing a test on corresponding pairs of the blocks of the reference frame and the subsequent frame in turn, the test comprising calculating a difference measure indicative of the difference between the blocks of the pair being tested and comparing the difference measure to a threshold, wherein the test is passed if the difference measure betters the threshold, and if all of the pairs of blocks pass the test an indication is provided that the reference frame and the subsequent frame can be considered to be static.

If the test is not passed by a pair of blocks, an indication may be provided that the reference frame and the subsequent frame are deemed to be different.

The subsequent frame may be selected to optimize the evaluation of the sequence of frames.

For example, to detect a sequence of N static frames in a longer sequence of video frames, it is possible to step through the longer sequence in steps of (N/2) frames. If the (N/2)th subsequent frame is different from the reference frame, then there is no need to compare intermediate frames between the reference frame and the (N/2)th subsequent frame, since it may be concluded that it is not possible for there to exist a sequence of N static frames including both the reference frame and the (N/2)th subsequent frame.

Thus, to evaluate a sequence of N video frames, the (N/2)th subsequent frame may be selected.

If the reference frame and the subsequent frame are considered to be static, the method may be repeated using new subsequent frames selected from the remaining frames in the sequence, until either a subsequent frame is deemed to be different from the reference frame, or a predefined number N of the frames within the sequence can be considered to be static.

According to a third aspect of the invention, there is provided an apparatus for evaluating whether an image under test is similar to a reference image, the apparatus comprising testing means for performing a test on pairs of blocks in turn, each pair of blocks comprising a block of the image under test and a corresponding block of the reference image, the test comprising calculating a difference measure indicative of the difference between the blocks and comparing the difference measure to a threshold, wherein the test is passed if the difference measure betters the threshold, and the image under test and the reference image are deemed to be similar if the test is passed by all of the pairs of blocks.

The apparatus may further comprise indicating means for indicating that the image under test and the reference image are deemed to be different if the test is not passed by a pair of blocks.

Preferably, a first pair of blocks to be tested is selected to maximize the likelihood that the test will not be passed.

For example, a pair of blocks positioned towards the center of their respective images may be selected.

The threshold may be adjustable, according to the level of sensitivity or noise immunity required.

The threshold may be derived as a function of one of the image under test and the reference image.

For example, the threshold may be derived from statistical properties of one of the image under test and the reference image.

The difference measure may comprise a root mean squared (RMS) difference measure.

Alternatively, the difference measure may comprise a mean absolute difference (MAD) difference measure.

Alternatively, the difference measure may be calculated by calculating difference values of corresponding pixels of the pair of blocks, and counting the number of the difference values that exceed a threshold.

The image under test and the reference image may be video frames.

According to a fourth aspect of the invention, there is provided an apparatus for evaluating whether a sequence of video frames can be considered to be static, the apparatus comprising video capture means for capturing a reference frame and a subsequent frame of the sequence and testing means for performing a test on corresponding pairs of the blocks of the reference frame and the subsequent frame in turn, the test comprising calculating a difference measure indicative of the difference between the blocks of the pair being tested and comparing the difference measure to a threshold, wherein the test is passed if the difference measure betters the threshold, and if the test is passed by all of the pairs of blocks, indicating means provide an indication that the reference frame and the subsequent frame can be considered to be static.

If the test is not passed by a pair of blocks, the indicating means may provide an indication that the reference frame and the subsequent frame are deemed to be different.

The subsequent frame may be selected from the frames captured by the video capture means to optimize the evaluation of the sequence of frames.

For example, to detect a sequence of N static frames in a longer sequence of video frames, it is possible to step through the longer sequence in steps of (N/2) frames. If the (N/2)th subsequent frame is different from the reference frame, then there is no need to compare intermediate frames between the reference frame and the (N/2)th subsequent frame, since it may be concluded that it is not possible for there to exist a sequence of N static frames including both the reference frame and the (N/2)th subsequent frame.

Thus, to evaluate a sequence of N video frames, the (N/2)th subsequent frame may be selected.

If the indicating means indicates that the reference frame and the subsequent frame are considered to be static, new subsequent frames may be selected from the remaining frames in the sequence and evaluated, until either a subsequent frame is deemed to be different from the reference frame, or a predefined number N of the frames within the sequence can be considered to be static.

According to a fifth aspect of the invention, there is provided a program for causing processing means to perform a method according to the first or second aspect of the invention.

Embodiments of the invention will now be described in detail, strictly by way of example only, with reference to the accompanying drawings, of which:

DETAILED DESCRIPTION

Figure 1:
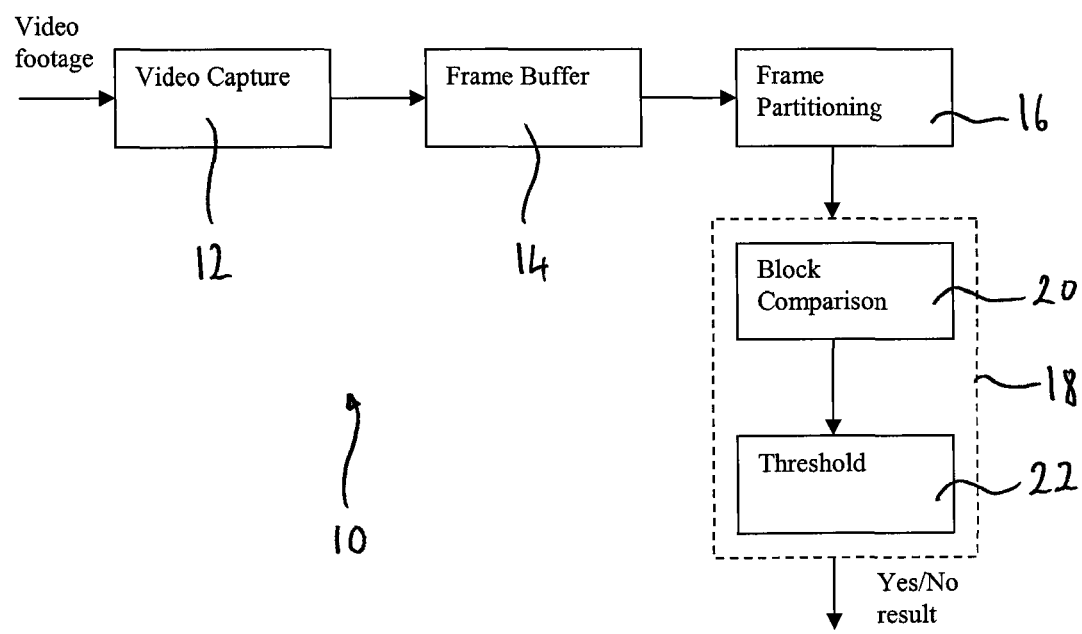
FIG. 1 is a schematic diagram showing functional blocks of an apparatus for determining whether a sequence of video frames can be considered to be static.

FIG. 1 is a schematic illustration showing functional blocks of an apparatus for determining whether a sequence of video frames can be considered to be static, although it will be appreciated that the functional blocks do not necessarily represent physical components of such an apparatus.

The apparatus, shown generally at 10 in FIG. 1, may be an electronic test instrument, or a subsystem of such an instrument, for example, and comprises a video capture unit 12 for capturing video footage and a frame buffer 14 for storing a plurality of frames of captured video footage. The video footage captured by the video capture unit 12 may be streaming video or may be file-based, and may be compressed or uncompressed. Those skilled in the art will recognize that many different devices are suitable for use as the video capture unit 12, and thus this element will not be described in detail.

The frame buffer 14 may comprise a hard disc or random access memory (RAM), for example, but it will be appreciated by those skilled in the art that any form of storage which meets the storage capacity and access speed requirements of the apparatus 10 is equally suitable.

A frame partitioning unit 16 is linked to the frame buffer 14, and is configured to partition video frames retrieved from the frame buffer 14 into blocks, as is described in more detail below. Typically the frame partitioning unit 16 operates on only one video frame at a time, passing each partitioned video frame to a test unit 18, but the frame partitioning unit 16 is equally capable of operating on two or more frames simultaneously.

The test unit 18 is configured to receive partitioned video frames from the frame partitioning unit 16 and provide a binary (i.e. yes/no or pass/fail) test result. The test unit 18 comprises a block comparison unit 20 which is configured to compare pairs of corresponding blocks of the partitioned frames provided by the frame partitioning unit 16 and to generate a difference measure indicative of the difference between a block of a reference frame and a corresponding block of a subsequent frame of the captured video footage, as described below. The difference measure generated by the block comparison unit 20 is passed to a threshold unit 22, which compares the difference measure to a predetermined threshold to determine whether or not the test has been passed by the pair of blocks, and this test result is provided as an output of the test unit 20.

The frame partitioning unit 16 and the test unit 18 may be integral to the apparatus 10, or may be provided as a standalone apparatus which interfaces with the video capture unit 12 and the frame buffer unit 14.

Figure 2:
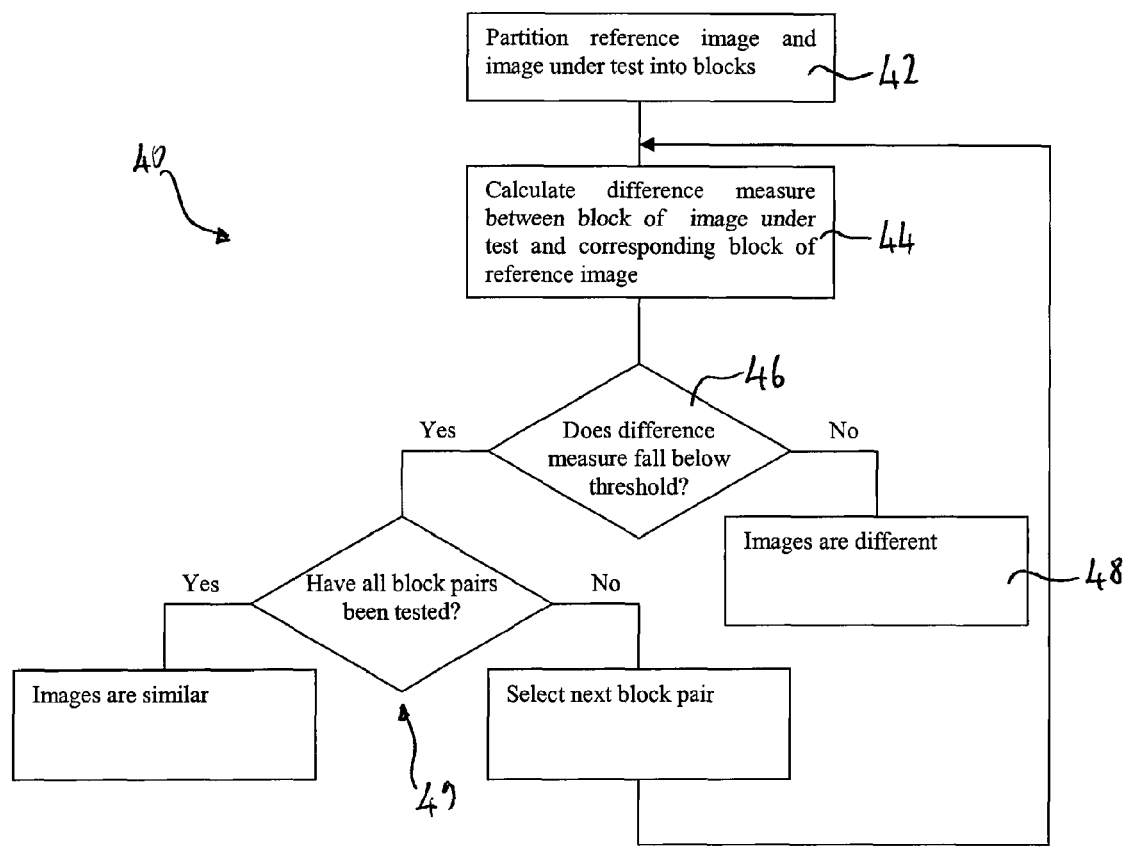
FIG. 2 is a flow chart illustrating the steps carried by a method for determining whether an image under test is similar to a reference image according to the invention.

Referring now to FIG. 2, a method of determining whether two images are similar, which may be used in the apparatus 10 of FIG. 1, is illustrated generally at 40.

The images, hereinafter referred to as the reference image and the image under test, are made up of pixels, with each pixel having a value defining its color and brightness. Typically, this value is an eight bit number, although systems exist which use different numbers of bits. This exemplary embodiment uses the YUV color system, in which each pixel value is made up of a Luma component, Y, which defines the brightness of the pixel, and two chrominance components, U and V, which define the color of the pixel. However, the invention is equally applicable to other color systems, such as RGB and $YC_bC_r$.

In this embodiment, only the Luma (brightness) component is of interest. Thus, the reference image and the image under test can be thought of as rectangular arrays of numbers, with each number in the array representing the brightness of the pixel located in the corresponding position in the image.

Figure 4:
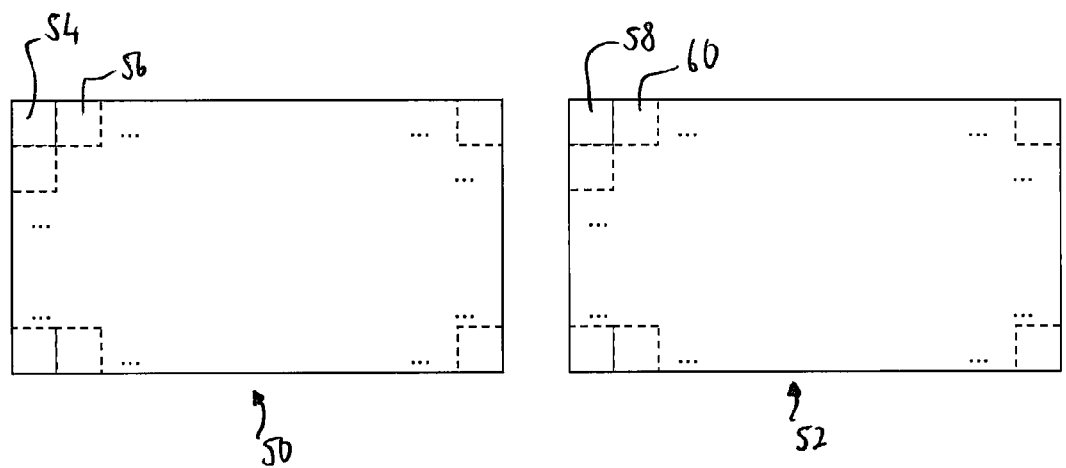
FIG. 4 is a schematic illustration of images partitioned into blocks.

The first step in the method is to partition the reference image and the image under test into blocks of pixels, as is shown at block 42 in FIG. 2. This is illustrated schematically in FIG. 4, which shows a reference image 50 and an image under test 52 partitioned into square blocks 54, 56, 58, 60. It will be understood that although only a few blocks have been shown in FIG. 4 for reasons of clarity, both the reference image 50 and the image under test 52 are completely partitioned into blocks.

The blocks 54, 56, 58, 60 are all the same shape and size and are typically square blocks containing 256 pixels each (i.e. 16×16 pixel blocks), although other block sizes and shapes are of course possible. Thus, the blocks 54, 56, of the reference image 50 are the same shape and size as the blocks 58, 60 of the image under test 52. Moreover, the blocks occupy the same positions within the images. Thus, block 54 occupies a position in the upper left-hand corner of the reference image 50, and corresponds to block 58 which occupies the same position in the image under test 52. This correspondence between the blocks 54, 56, 58, 60 of the images is important, as the method relies on a "like for like" comparison of blocks. For the same reason, it is important that the reference image 50 and the image under test 52 are the same shape and size, although this will almost always be the case where the images 50, 52 are taken from a sequence of video frames.

Once the images 50, 52 have been partitioned into blocks 54, 56, 58, 60, a block comparison is performed, as indicated at 44 in the flow diagram of FIG. 2, to obtain a difference measure. In this step, a block of the image under test 52 is compared to a corresponding block of the reference image 50 to determine a difference measure indicative of the difference between the two blocks. For example, the block 58 of the image under test 52 is compared to the block 54 of the reference image 50.

In this example, the comparison is performed using a root mean squared (RMS) technique. Using this technique, the value of the difference between the Luma (brightness) value Y of each pixel of the selected block 58 of the image under test 52 and the Luma value of a corresponding pixel of the block 54 of the reference image 50 corresponding to the selected block 58 of the image under test 52 is calculated, and each of these difference values is squared. A mean of the resulting squares is then calculated, and the square root of this mean is calculated, giving the difference measure which represents the visual difference between the selected block 58 of the image under test 52 and the corresponding block 54 of the reference image 50.

Figure 5:
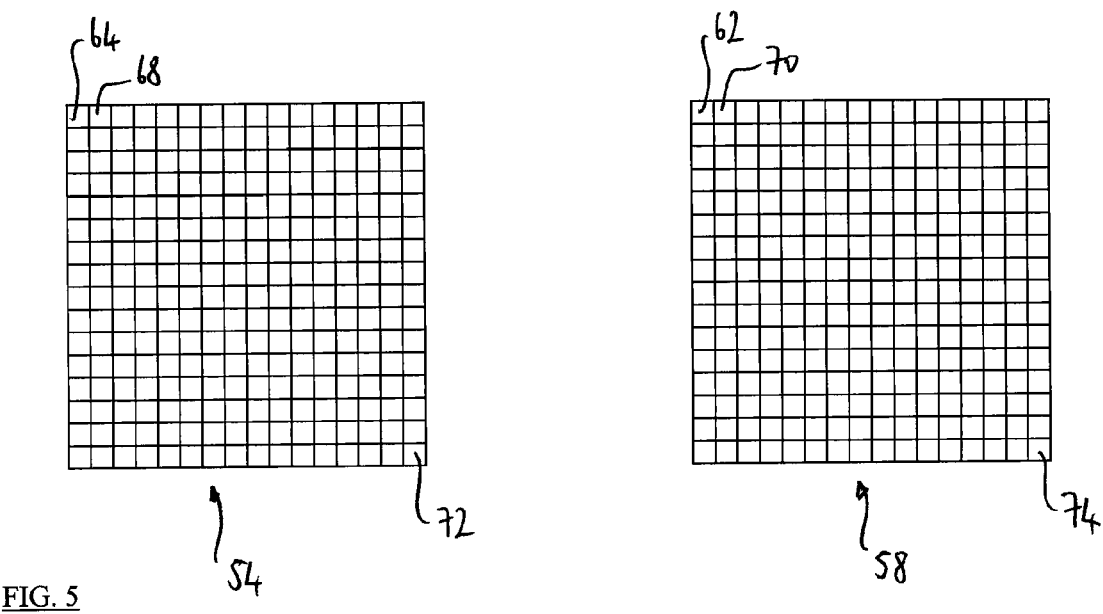
FIG. 5 is a schematic illustration of the blocks shown in FIG. 4, showing pixels of the blocks.

This is illustrated schematically in FIG. 5, which shows the selected block 54 of the image under test 52 and the corresponding block 58 of the reference image 50. To calculate the difference measure, the Luma value of a pixel 64 of the selected block 54 of the reference image 52 is subtracted from the Luma value of a corresponding pixel 62 of the block 60 of the image under test 52, and the result is squared. This process is repeated for the next pixel 70 of the block 58 and the corresponding pixel 68 of the block 54, and for the remaining pixels of the selected blocks 54, 58, stopping only when the process has been repeated for the last pixel 74 of the block 58 and the corresponding pixel 72 of the block 54. The mean of the resulting squares is then calculated, and the square root of the mean is calculated, to give the difference measure.

The difference measure D can be expressed as:

$$D = \sqrt{\frac{1}{MN} \sum_{y=0}^{M-1} \sum_{x=0}^{N-1} (P_{test}(x, y) - P_{ref}(x, y))^2}$$

where $P_{test}(x, y)$ is the Luma value of the pixel at position (x, y) in the image under test, $P_{ref}(x, y)$ is the Luma value of the pixel at position (x, y) in the reference image M is the number of rows of pixels in the block and N is the number of columns of pixels in the block. In the example given above, where the blocks 54, 58 are 16×16 pixel blocks, M=N=16.

An alternative approach to calculating the difference measure is to use the mean absolute difference (MAD) technique. In this technique, the differences between each corresponding pixel of the blocks 54, 58 are calculated, and then summed over all of the pixels in the blocks. The difference measure is calculated by dividing the result of this summation by the total number of pixels in one block.

The difference measure D, when calculated using the MAD technique, can be expressed as:

$$D = \frac{1}{MN} \sum_{y=0}^{M-1} \sum_{x=0}^{N-1} |(P_{test}(x, y) - P_{ref}(x, y))|$$

where $P_{test}(x, y)$ is the Luma value of the pixel at position (x, y) in the image under test, $P_{ref}(x, y)$ is the Luma value of the pixel at position (x, y) in the reference image M is the number of rows of pixels in the block and N is the number of columns of pixels in the block. In the example given above, where the blocks 54, 58 are 16×16 pixel blocks, M=N=16.

A further alternative approach to calculating the difference measure is to calculate the difference values of each corresponding pixel of the blocks 54, 58, and to count how many of these difference values exceed a predetermined threshold. This number then carried forward as the difference measure for use in the later steps of the method.

Of course, other techniques may be used to determine the difference measure, and such techniques will be well known to those skilled in the art.

Once the difference measure has been calculated, a test is performed (at step 46 in FIG. 2) on the difference measure to determine whether the image under test 52 and the reference image 50 are different. The difference measure is compared to a threshold, which is set to a value at which noise in the images 52, 50 will not affect the outcome of the test, and if the difference measure exceeds the threshold, indicating that there are significant differences between the Luma values of the pixels of the block 58 of the image under test 52 and the Luma values of the pixels of the corresponding block 54 of the reference image 50, the image under test 52 is deemed to be different from the reference image 50, as is shown at step 48 in FIG. 2. Conversely, if the difference measure falls below the threshold, it cannot be concluded that the image under test 52 is similar to the reference image 50 until all of the block pairs have been tested, as is indicated generally at 49.

Thus, all of the pairs of blocks of the images 50, 52 are tested in turn, until either one of the pairs of blocks fails the test, indicating that the images 50, 52 are different, or all of the pairs of blocks have passed the test, indicating that the images 50, 52 are similar.

The threshold may be a predetermined number which is indicative of an acceptable degree of difference or similarity between the blocks 54, 58. Alternatively, the threshold may be derived intelligently as a function of the blocks 54, 58 being tested or the images 50, 52 being evaluated. For example, the threshold may be set as a multiple of the standard deviation of a probability distribution of the pixel values of the reference image 50. Of course, other methods for intelligently deriving the threshold will be familiar to those skilled in the art.

The threshold may be adjustable, such that by adjusting the threshold, the test can be made more or less sensitive to the effects of noise. For example, reducing the threshold may result in the result of the test being adversely affected by noise in one or both of the images 50, 52. However, if the threshold is increased to too high a level, genuine differences between the blocks 58, 54 may not be recognized. Thus, a threshold must be selected which balances noise immunity with sensitivity.

In the example described above, the first blocks 54, 58 to be tested are those which occupy the top-left hand corner of the image under test 52 and the reference image 50, and subsequent blocks may be chosen for testing simply by moving along rows of blocks of the images 50, 52. For example, the second blocks to be tested may be the blocks 56, 60 immediately to the right of the first blocks 54, 58.

In practice, however, movement (i.e. changes in pixel values) is unlikely to occur towards the top left-hand corner of the images 50, 52. Thus, to increase the likelihood that a pair of blocks will fail the test early in the testing process, a pair of blocks located at a part of the images where movement is likely to occur may be selected as the first pair of blocks to be tested. For example, movement may be most likely to occur towards the center of the images 50, 52, and thus a pair of blocks located towards the center of the images 50, 52 may be selected as the first pair to be tested. If this pair of blocks passes the test, an adjacent pair may be selected, with subsequent blocks to be tested being selected by following an outward spiral of blocks centered on the first pair selected for testing. Although this approach adds complexity, as the selection of the second and subsequent blocks is more complicated than a simple selection of the next block in a row, the increased likelihood that a selected pair of blocks will fail the test early in the testing process gives rise to speed and processing burden advantages, as the testing process can be exited earlier than if a linear (i.e. row by row) approach were used.

Figure 3:
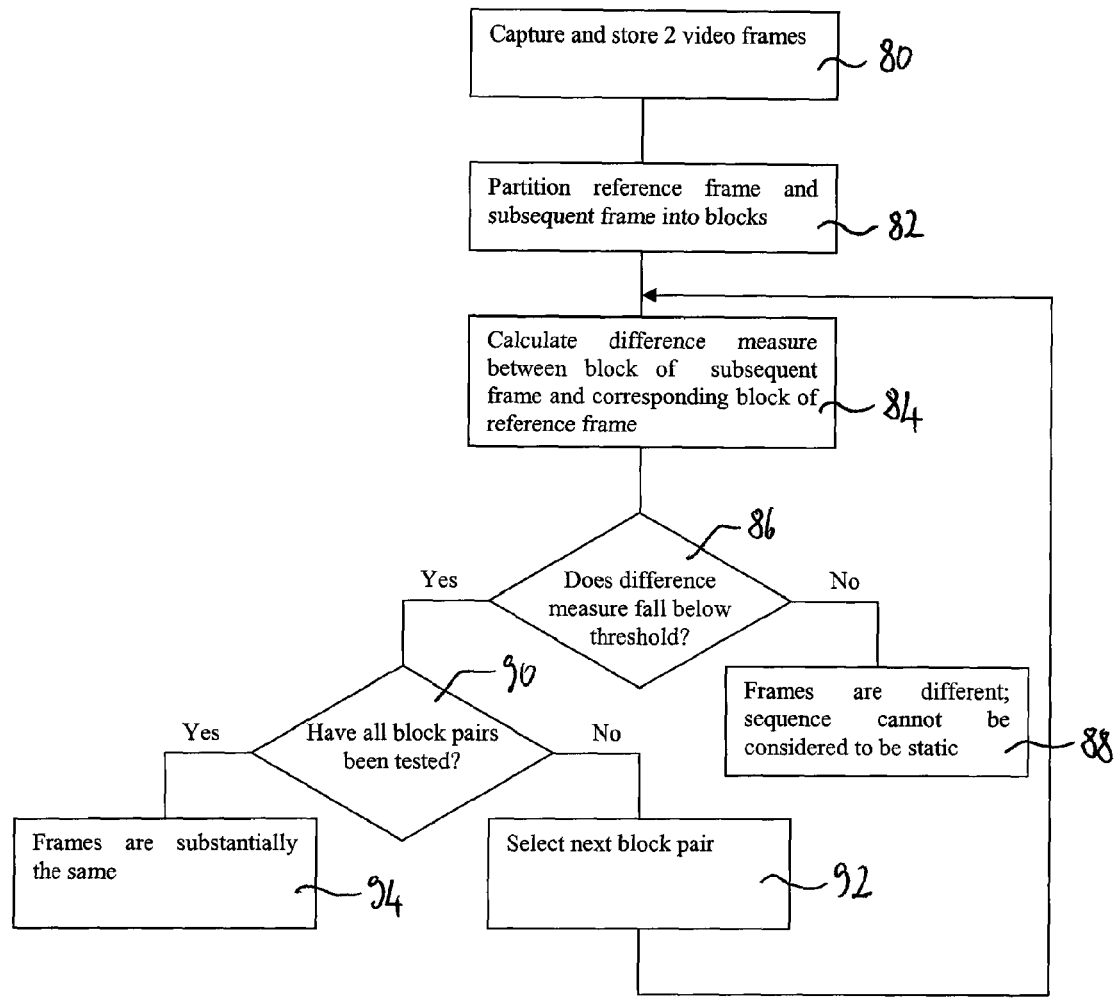
FIG. 3 is a flow chart illustrating an adaptation of the method shown in FIG. 3 which can be used to determine whether a sequence of video frames can be considered to be static.

FIG. 3 shows a version of the method presented in FIG. 2 which is adapted to the application of determining whether a sequence of video frames in a piece of video footage can be considered to be static (i.e. the video frames are substantially identical). The example given in FIG. 3 and explained below refers to only two video frames (referred to as a reference frame 50 and a subsequent frame 52), but it will be appreciated that the method applies to sequences of more than two frames, as consecutive frames are evaluated by the method. In the case of a three-frame sequence, for example, the frame that was the subsequent frame 52 at the outset may become the reference frame 50 when the frame following it is evaluated.

The method illustrated in FIG. 3 is similar to that of FIG. 2, although it includes an initial step 80 of capturing and storing at least two frames of video footage. At step 82, a reference frame, which is typically the first frame of the captured sequence, and a subsequent frame, which is typically the second frame of the captured sequence, are partitioned into blocks, as described above. A difference measure between corresponding blocks of the subsequent frame and the reference frame is determined using the technique described above, or another suitable technique, and this difference measure is compared to a threshold at step 86. If the difference measure exceeds the threshold, there is a substantial difference between the blocks which have been tested, indicating that there is a difference between the reference frame and the subsequent frame, and thus this frame sequence cannot be considered to be static, as is indicated at block 88.

If the difference measure falls below the threshold, a check is made at step 90 to determine whether all of the block pairs of the subsequent frame and the reference frame have been tested. If the result of this check is negative, the next pair of corresponding blocks is selected (at step 92), and undergoes the test performed in steps 84 and 85. If all of the block pairs have been tested and found to fall below the threshold, the subsequent frame 52 and the reference frame 50 are sufficiently similar to each other that they can be said to be static (as shown at block 94), and an indication of this may be provided.

To evaluate whether a sequence of more than two frames can be considered to be static, it is necessary to test some or all of the frames in the sequence. In one embodiment, each frame in a frame sequence is compared to a preceding frame in the sequence using the method described above. If a frame is sufficiently similar to the preceding frame, a counter is incremented, and the next frame in the sequence is tested. If the counter reaches a predefined number, for example 25, indicating in this example that 25 consecutive frames are similar to each other, an indication may be provided the sequence of the 25 frames tested can be considered to be static. However, if the method indicates that a frame is different from a preceding frame before the counter reaches the predefined number, the counter is reset to zero, and no such indication is provided.

The predefined number may be variable, and may represent a number of frames, or a duration in time for which the video sequence is static, or frozen. For example, in a video sequence which is normally viewed at 25 frames per second, if the predefined number is set to 25, this represents a frozen video sequence one second in duration.

It will be appreciated that comparing each frame to its preceding frame is time consuming and computationally expensive. Thus, to optimize the process of evaluating whether a sequence of video frames can be considered to be static, an alternative approach may be adopted. In this approach, a reference frame is initially compared not to the frame immediately following it, but to a later frame in the sequence. For example, to evaluate whether a sequence of N frames within a longer sequence of video frames can be considered to be static, a reference frame, typically the first frame in the sequence, is initially compared to the (N/2)th frame. If the reference frame and the (N/2)th frame are deemed to be different, then there cannot be said to be a sequence of N static frames which includes both the reference frame and the (N/2)th frame. However, if the reference frame and the (N/2)th frame are deemed to be similar, the reference frame is compared to the remaining frames in the sequence of N frames, until either one of the frames in the sequence is deemed to be different to the others or it is determined that all of the frames in the sequence of N frames are similar, and thus the sequence of N frames can be said to be static.

If the sequence of N frames is not static, this method ensures that only every (N/2)th frame needs to be tested, rather than every frame in the sequence of N frames, and by performing the frame comparison operation on fewer frames, the number of "wasted" comparison operations is reduced, therefore increasing the speed of evaluating the video sequence and reducing the processing burden involved. Of course, other frames may be selected for the initial comparison, if appropriate.

It will be appreciated that the methods of the present invention can be implemented in a variety of different ways. For example, the methods may be implemented as computer programs configured to cause a processor to carry out the methods. Alternatively, the methods may be carried out in hardware, for example in apparatus as described above with reference to FIG. 1, or using an application specific integrated circuit (ASIC) or a suitably programmed microprocessor.

What is claimed is:

1. A method for evaluating whether a test image is similar to a reference image comprising the steps of:
   partitioning the reference image and the test image into a plurality of blocks of pixels, the blocks in the reference image being of the same shape and size as the blocks in the test image and occupying the same positions within the images to form a plurality of block pairs;
   initially selecting a first block pair having a maximum likelihood of dissimilarity;
   calculating a difference measure between the blocks in one of the block pairs;
   comparing the difference measure with a threshold to determine whether the one block pair indicates similarity of the reference and test images;
   terminating the calculating and comparing steps if the difference measure between the reference image and the test image exceeds the threshold; and
   providing an indication that the reference and test images are similar if the difference measures for all the block pairs fall below the threshold.

2. The method as recited in claim 1 further comprising the step of terminating the calculating and comparing steps if the difference measure for one of the block pairs exceeds the threshold, indicative of dissimilarity between the reference and test images.

3. The method as recited in claim 1 wherein the first block pair is positioned toward the center of the respective images.

4. The method as recited in claim 1 further comprising the step of adjusting the threshold according to a desired level of sensitivity or noise immunity.

5. The method as recited in claim 1 further comprising the step of deriving the threshold as a function of one of the reference image or test image.

6. The method as recited in claim 1 further comprising the step of deriving the threshold from statistical properties of one of the reference image or test image.

7. The method as recited in claim 1 wherein the calculating step comprises the step of calculating an RMS difference as the difference measure.

8. The method as recited in claim 1 wherein the calculating step comprises the step of calculating a MAD difference as the difference measure.

9. The method as recited in claim 1 wherein the calculating step comprises the steps of:
   calculating difference values for corresponding pixels of the block pair; and counting a number of difference values that exceed a difference threshold as the difference measure.

10. A method of evaluating whether a sequence of video frames is static comprising the steps of:
  capturing a reference frame and a first subsequent frame from the sequence of video frames as a reference image and a test image respectively;
  partitioning the reference image and the test image into a plurality of blocks of pixels, the blocks in the reference image being of the same shape and size as the blocks in the test image and occupying the same positions within the images to form a plurality of block pairs;
  calculating a difference measure between the blocks in one of the block pairs;
  comparing the difference measure with a threshold to determine whether the one block pair indicates similarity of the reference and test images;
  repeating the calculating and comparing steps for each block pair in turn so long as there is similarity between the blocks in the block pair;
  providing an indication that the reference frame and first subsequent frame are similar if the difference measures for all the block pairs fall below the threshold; and
  optimizing the evaluation of the sequence of frames including selecting the subsequent frame.

11. The method as recited in claim 10 further comprising the step of indicating that the reference and test images are different when the difference measure for one of the block pairs exceeds the threshold.

12. The method as recited in claim 10 further comprising the step of selecting the (N/2)th subsequent frame as the subsequent frame where the sequence of frames being evaluated contains N video frames.

13. The method as recited in claim 10 further comprising the step of selecting other subsequent frames from the sequence of video frames as the test image for evaluating against the reference image when prior subsequent frames and the reference frame are evaluated to be static until either (i) one of the other subsequent frames is evaluated to be different from the reference frame or (ii) a predefined number of frames in the sequence are evaluated to be static.

14. An apparatus for evaluating whether a test image is similar to a reference image comprising:
  means for partitioning the reference image and the test image into a plurality of blocks of pixels, the blocks in the reference image being of the same shape and size as the blocks in the test image and occupying respectively the same positions within the test and reference images to form a plurality of block pairs;
  means for calculating a difference measure between the blocks each of the block pairs in turn;
  means for comparing each difference measure for each block pair in turn with a threshold to determine whether the block pair indicates similarity of the reference and test images;
  means for terminating the calculating and comparing steps if the difference measure between the reference image and the test image exceeds the threshold;
  means for providing an indication that the reference and test images are similar if the difference measures for all the block pairs fall below the threshold; and
  means for selecting the block pairs for input to the calculating and comparing means in an order that maximizes the likelihood that the providing means will provide the indication that the reference and test images are different.

15. The apparatus as recited in claim 14 wherein the providing means provides an indication that the reference and test images are different if the difference measure for any of the block pairs exceeds the threshold.

16. The apparatus as recited in claim 14 wherein the selecting means initially selects pairs of blocks positioned toward the center of the reference and test images.

17. The apparatus as recited in claim 14 further comprising means for adjusting the threshold according to a desired level of sensitivity or noise immunity.

18. The apparatus as recited in claim 14 further comprising means for determining the threshold as a function of one of the reference image and the test image.

19. The apparatus as recited in claim 14 further comprising means for determining the threshold as a function of the statistical properties of one of the reference image and the test image.

20. The apparatus as recited in claim 14 wherein the calculating means determines the difference measure as an RMS difference.

21. The apparatus as recited in claim 14 wherein the calculating means determines the difference measure as a MAD difference.

22. The apparatus as recited in claim 14 wherein the calculating means determines the difference measure as a number of difference values of corresponding pixels in each pair of blocks which exceed a difference threshold.

23. An apparatus for evaluating whether a sequence of video frames are static comprising:
  means for capturing a reference frame and a first subsequent frame from the sequence of video frames as a reference image and a test image respectively;
  means for partitioning the reference image and the test image into a plurality of blocks of pixels, the blocks in the reference image being of the same shape and size as the blocks in the test image and occupying the same positions within the images to form a plurality of block pairs;
  means for calculating a difference measure between the blocks in each of the block pairs;
  means for comparing the difference measure for each block pair with a threshold to determine whether the block pair indicates similarity of the reference and test images;
  means for terminating the calculating and comparing steps if the difference measure between the reference image and the test image exceeds the threshold;
  means for providing an indication that the reference frame and first subsequent frame are similar if the difference measures for all the block pairs fall below the threshold; and
  means for optimizing the evaluation of the sequence of frames by selecting the subsequent frame from the frames captured by the capturing means.

24. The apparatus as recited in claim 23 wherein the providing means provides an indication that the reference frame and subsequent frame are different if any one of the difference measures for the block pairs exceeds the threshold.

25. The apparatus as recited in claim 23 further comprising means for selecting initially as the subsequent frame the (N/2)th frame from the capturing means when the sequence of video frames includes N frames.

26. The apparatus as recited in claim 25 wherein the selecting means subsequently selects the subsequent frames from the remaining frames of the video sequence until either the subsequent frame is different from the reference frame or all N frames are deemed to be similar.

* * * * *